United States Patent
Forman et al.

(10) Patent No.: US 6,823,323 B2
(45) Date of Patent: Nov. 23, 2004

(54) AUTOMATIC CLASSIFICATION METHOD AND APPARATUS

(75) Inventors: George H. Forman, Port Orchard, WA (US); Henri J. Suermondt, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 450 days.

(21) Appl. No.: 09/844,202

(22) Filed: Apr. 26, 2001

(65) Prior Publication Data

US 2002/0161761 A1 Oct. 31, 2002

(51) Int. Cl.[7] .............................. G06E 1/00; G06E 3/00; G06F 15/18; G06G 7/00
(52) U.S. Cl. .............................. 706/20; 706/14; 706/25
(58) Field of Search .............................. 706/14, 20, 25

(56) References Cited

U.S. PATENT DOCUMENTS

| | | | |
|---|---|---|---|
| 5,371,807 A | | 12/1994 | Register et al. |
| 5,671,333 A | | 9/1997 | Catlett et al. |
| 5,719,692 A | | 2/1998 | Cohen |
| 5,787,274 A | | 7/1998 | Agrawal et al. |
| 5,835,633 A | * | 11/1998 | Fujisaki et al. .............. 382/187 |
| 5,930,788 A | | 7/1999 | Wical |
| 5,930,803 A | | 7/1999 | Becker et al. |
| 5,991,709 A | | 11/1999 | Schoen |
| 6,061,675 A | | 5/2000 | Wical |
| 6,137,911 A | | 10/2000 | Zhilyaev |
| 6,161,130 A | | 12/2000 | Horvitz et al. |
| 6,182,058 B1 | | 1/2001 | Kohavi |
| 6,192,360 B1 | * | 2/2001 | Dumais et al. ................. 707/6 |
| 6,301,571 B1 | * | 10/2001 | Tatsuoka ...................... 706/45 |
| 6,519,580 B1 | * | 2/2003 | Johnson et al. ............... 706/47 |
| 2002/0083067 A1 | * | 6/2002 | Tamayo et al. ............. 707/100 |

OTHER PUBLICATIONS

Pedro Domingos, "MetaCost: A General Method for Making Classifiers Cost–Sensitive," Proceedings of the Fifth International Conference on Knowledge Discovery and Data Mining, San Diego, CA, ACM Press, pp. 155–164, 1999.

\* cited by examiner

*Primary Examiner*—Anthony Knight
*Assistant Examiner*—Joseph P. Hirl

(57) ABSTRACT

Methods and apparatus for classifying an instance (i.e., a data item or a record) automatically into one or more classes selected from a set of potential classes are described. This multi-class classification approach enables instances to be classified with high accuracy, even when the number of classes is very large. In accordance with one classification scheme, a subset of two or more classes to which the instance is determined to most likely belong is selected from the set of potential classes. A classifier that is generated from a set of training records corresponding to a class set inclusive of the selected subset of classes is applied to the instance a to identify at least one class to which the instance most likely belongs.

20 Claims, 5 Drawing Sheets

AUTOMATIC CLASSIFICATION METHOD AND APPARATUS

TECHNICAL FIELD

This invention relates to methods and apparatus for classifying an instance (i.e., a data item or a record) automatically into one or more classes that are selected from a set of potential classes.

BACKGROUND

The volume of machine-readable data that currently is available, for example on the Internet, is growing at a rapid rate. In order to realize the potentially huge benefits of computer access to this data, the data must be classified into categories (or classes). Traditionally, such data has been classified by humans. As the amount of data has increased, however, manual data interpretation has become increasingly impractical. Recently, classifiers have been implemented to classify data automatically into one or more potential classes.

A classifier provides a function that maps (or classifies) an instance into one of several predefined potential classes. In particular, a classifier predicts one attribute of a set of data given one or more attributes. The attribute being predicted is called the label, and the attributes used for prediction are called descriptive attributes. A classifier typically is constructed by an inducer, which is an algorithm that builds the classifier from a training set. The training set consists of records containing attributes, one of which is the class label. After a classifier has been built, its structure may be used to classify unlabeled records as belonging to one or more of the potential classes.

Many different classifiers have been proposed.

For example, a Decision Tree classifier is a well-known classifier. A Decision Tree classifier typically is built by a recursive partitioning inducing algorithm. A univariate (single attribute) split is chosen for the root of the decision tree using some criterion (e.g., mutual information, gain-ratio, or gini index). The data is then divided according to the test criterion, and the process repeats recursively for each child. After a full tree is built, a pruning step is executed to reduce the size of the tree. Generally, Decision Tree classifiers are preferred for serial classification tasks (i.e., once the value of a key feature is known, dependencies and distributions change). In addition, Decision Tree classifiers are preferred for classification tasks in which complexity may be reduced by segmenting data into sub-populations. Decision Tree classifiers also are preferred for classification tasks in which some features are more important than others. For example, in a mushroom dataset (a commonly used benchmark dataset), the odor attribute alone correctly predicts whether a mushroom is edible or poisonous with an accuracy of about 98%.

Another well-known classifier is the Naïve Bayes classifier. The Naïve Bayes classifier uses Bayes rule to compute the probability of each class given an instance, assuming attributes are conditionally independent for a given class label. The Naïve Bayes classifier requires estimation of the conditional probabilities for each attribute value given the class label. Naïve Bayes classifiers are very robust to irrelevant attributes and classification takes into account evidence from many attributes to make the final prediction, a property that is useful in many cases for which there is no "main effect." Naïve Bayes classifiers also are preferred when the attributes are conditionally independent.

A neural network is another well-known classifier. A neural network is a multilayer, hierarchical arrangement of identical processing elements (or neurons) Each neuron may have one or more inputs but only one output. Each neuron input is weighted by a coefficient. The output of a neuron typically is a function of the sum of its weighted inputs and a bias value. This function, also referred to as an activation function, is typically a sigmoid function. In the hierarchical arrangement of neurons, the output of a neuron in one layer may be distributed as an input to one or more neurons in a next layer. A typical neural network may include an input layer and two distinct layers: an input layer, an intermediate neuron layer, and an output neuron layer. The neural network is initialized and trained on known inputs having known output values (or classifications). Once the neural network is trained, it may be used to classify unknown inputs in accordance with the weights and biases determined during training.

Still other classifiers have been proposed.

SUMMARY

The invention features a novel multi-class classification approach that enables instances to be classified with high accuracy, even when the number of classes (or categories) is very large. In particular, the classification error rate dependence of the invention on the number of potential classes is substantially less pronounced than in other, known classification approaches under some conditions.

In one aspect, the invention features a method of classifying an instance into one or more classes that are selected from a set of potential classes. In accordance with this inventive method, a subset of two or more classes to which the instance is determined to most likely belong is selected from the set of potential classes. A second-stage classifier, which is referred to herein as a "scrutiny classifier," is generated from a set of training records corresponding to a class set inclusive of the selected subset of classes, and is applied to the instance to identify at least one class to which the instance most likely belongs.

As used herein the terms "instance," "record," and "data item" are intended to be synonymous.

Embodiments of the invention may include one or more of the following features.

In one embodiment, the scrutiny classifier is generated by a decision tree inducing algorithm (e.g., a C 4.5 type decision tree inducing algorithm). In other embodiments, the scrutiny classifier may be generated by a different kind of inducing algorithm (e.g., a Naïve Bayes inducing algorithm or a neural network inducing algorithm).

The scrutiny classifier preferably is generated from the set of training records. In some embodiments, the scrutiny classifier is generated on-the-fly from a set of training records corresponding to the selected subset of classes. In other embodiments, the scrutiny classifier is generated beforehand in anticipation of the instance to be classified. In these other embodiments, the scrutiny classifier may be generated based upon an occurrence probability estimate for the inclusive class set. The scrutiny classifier may be generated from training records corresponding to an inclusive class set encompassing the selected subset of classes.

A classifier that is generated from a set of training records corresponding to two or more classes identified by the scrutiny classifier may be applied to the instance to identify at least one class to which the instance is determined to most likely belong.

The initial subset of classes may be selected based upon assignment to each of the potential classes a probability estimate of the instance belonging to the class. In some embodiments, the selected subset of classes may consist of a preselected number of potential classes having highest assigned probability estimates. In other embodiments, the selected subset of classes may consist of a number of potential classes having highest assigned probability estimates and a cumulative assigned probability estimate exceeding a preselected threshold.

The probability estimates may be assigned to each potential class by applying to the instance a first-stage classifier, which is referred to herein as a "ballpark classifier." The ballpark classifier may be generated from a set of training records corresponding to the entire set of potential classes. The ballpark classifier may be generated, for example, by a Naïve Bayes inducing algorithm, a decision tree inducing algorithm, a neural network inducing algorithm, or other inducing algorithm.

In some embodiments, the subset of classes may be selected based at least in part upon a prescribed misclassification cost.

In another aspect of the invention, a classification system includes a ballpark classifier and a scrutiny classifier. The ballpark classifier is configured to select from the set of potential classes a subset of two or more classes to which the instance is determined to most likely belong. The scrutiny classifier is configured to identify from the selected subset of classes at least one class to which the instance most likely belongs.

In another aspect, the invention features a computer program residing on a computer-readable medium for causing a processor executing the computer program to classifying an instance into one or more classes that are selected from a set of potential classes. The computer program comprises instructions to: select from the set of potential classes a subset of two or more classes to which the instance is determined to most likely belong; and apply to the instance a scrutiny classifier that is generated from a set of training records corresponding to a class set inclusive of the selected subset of classes to identify at least one class to which the instance most likely belongs.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
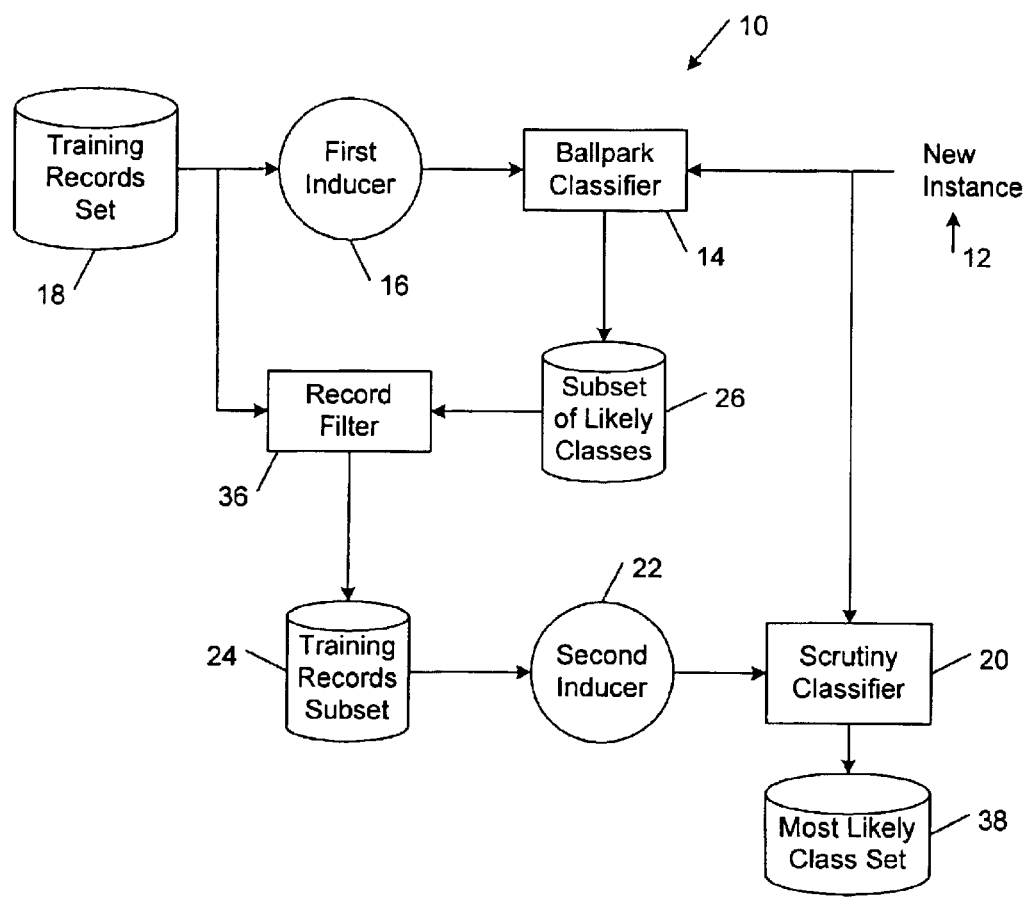
FIG. 1 is a block diagram of a method of classifying a new instance into one or more classes that are selected from a set of potential classes by sequentially applying to the new instance a ballpark classifier and a scrutiny classifier.

Referring to FIG. 1, in one embodiment, a system 10 for classifying a new instance 12 includes a ballpark classifier 14, which is generated by a first inducer 16 from a set of training records 18 corresponding to an entire set of potential classes into which new instance 12 may be classified. Classification system 10 also includes a scrutiny classifier 20, which is generated by a second inducer 22 from a set of training records 24 corresponding to a subset of classes 26 that is selected by ballpark classifier 14. First and second inducers 16, 22 may be the same or different, and each may be implemented as a conventional inducing algorithm (e.g., a Decision Tree inducing algorithm, a Naïve Bayes inducing algorithm or a neural network inducing algorithm). For example, in one embodiment, first inducer 16 is a Naïve Bayes inducing algorithm and second inducer 22 is a C 4.5 type of Decision Tree inducing algorithm. In some embodiments, scrutiny classifier 20 may use different (e.g., fewer or more relevant, or both) attributes (or features) than those used by ballpark classifier 14 to distinguish among the classes within likely (or ballpark) class subset 26. Training records set 18 may be a set of conventional training records. For example, in one embodiment, the training records set 18 corresponds to a database table containing a list of attributes, one of which is designated as a class label attribute.

Figure 2:
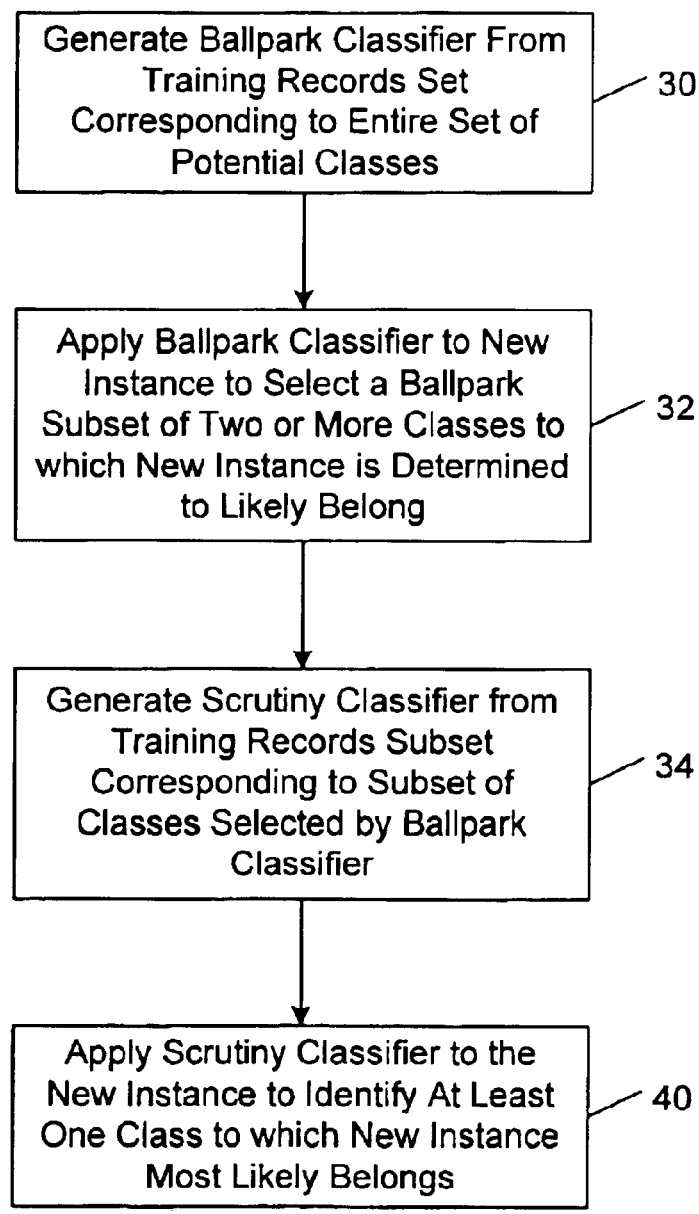
FIG. 2 is a flow diagram of the classification method of FIG. 1.

Referring to both FIG. 1 and FIG. 2, in operation, ballpark classifier 14 is generated by first inducer 16 from a set 18 of training records corresponding to the entire set of potential classes into which new instance 12 may be classified (step 30). Once built, ballpark classifier 14 is applied to new instance 12 to select a subset 26 of two or more of the potential classes to which new instance 12 is determined to likely belong (step 32). In one embodiment, ballpark classifier 14 is a Naïve Bayes classifier that is configured to assign to each of the potential classes ($c_i$) a probability estimate ($p_i$) of new instance 12 belonging to the class. In this embodiment, the ballpark class set ($S_1$) may be generated by selecting a preselected number (N) of potential classes (i.e., $S_1=\{c_1, c_2, \ldots, c_N\}$) having the highest assigned probability estimates. Alternatively, the ballpark class set ($S_1$) may be generated by selecting a number of most likely classes until their cumulative assigned probability estimate (i.e., $p_1+p_2+\ldots+p_K$) exceeds a preselected threshold $P_{CUM}$ (i.e., $p_1+p_2+\ldots+p_K \geq P_{CUM}$) Scrutiny classifier 20 is generated by second inducer 22 from a second set of training records corresponding to the subset of classes selected by ballpark classifier 14 (step 34). The second training records subset 24 may be identified by applying a record filter 36 to the entire training records set 18. Once built, scrutiny classifier 20 is applied to new instance 12 to identify a set 38 of at least one class to which new instance 12 most likely belongs (step 40).

In one embodiment, the size of the ballpark class set 26 may be tailored to accommodate explicit statements about the cost of misclassification, a cost that may vary widely depending upon the nature of the classification application. For example, for an application such as pre-cancer detection, the cost of a misclassification may be extremely high. That is, erroneously labeling a healthy tissue as pre-cancerous may be corrected when further tests are performed, whereas labeling a pre-cancerous tissue as healthy may lead to disastrous consequences. Accordingly, for such applications, the size of the ballpark class set 26 may be increased based upon the magnitude of the misclassification cost until a desired classification sensitivity is achieved. For other applications, such as text classification, the misclassification cost may be relatively low, in which case the size of the ballpark class set 26 may be relatively small. An appropriate cost function may be incorporated into first inducer 16 in a conventional way.

In some embodiments, scrutiny classifier 20 may be generated on-the-fly as soon as ballpark class subset 26 has been selected by ballpark classifier 14. In other embodiments, scrutiny classifier 20 may be generated beforehand in anticipation of a new instance to be classified. In these embodiments, scrutiny classifiers that are generated during a particular classification session may be cached (i.e., stored in short term memory). Alternatively, a set of scrutiny classifiers may be pre-generated, for example, based upon a determination of the sets of classes that are most likely to occur. The particular scrutiny classifiers that are pre-generated may be selected based upon training cases, experience, or one or more theoretical models.

Figure 3:
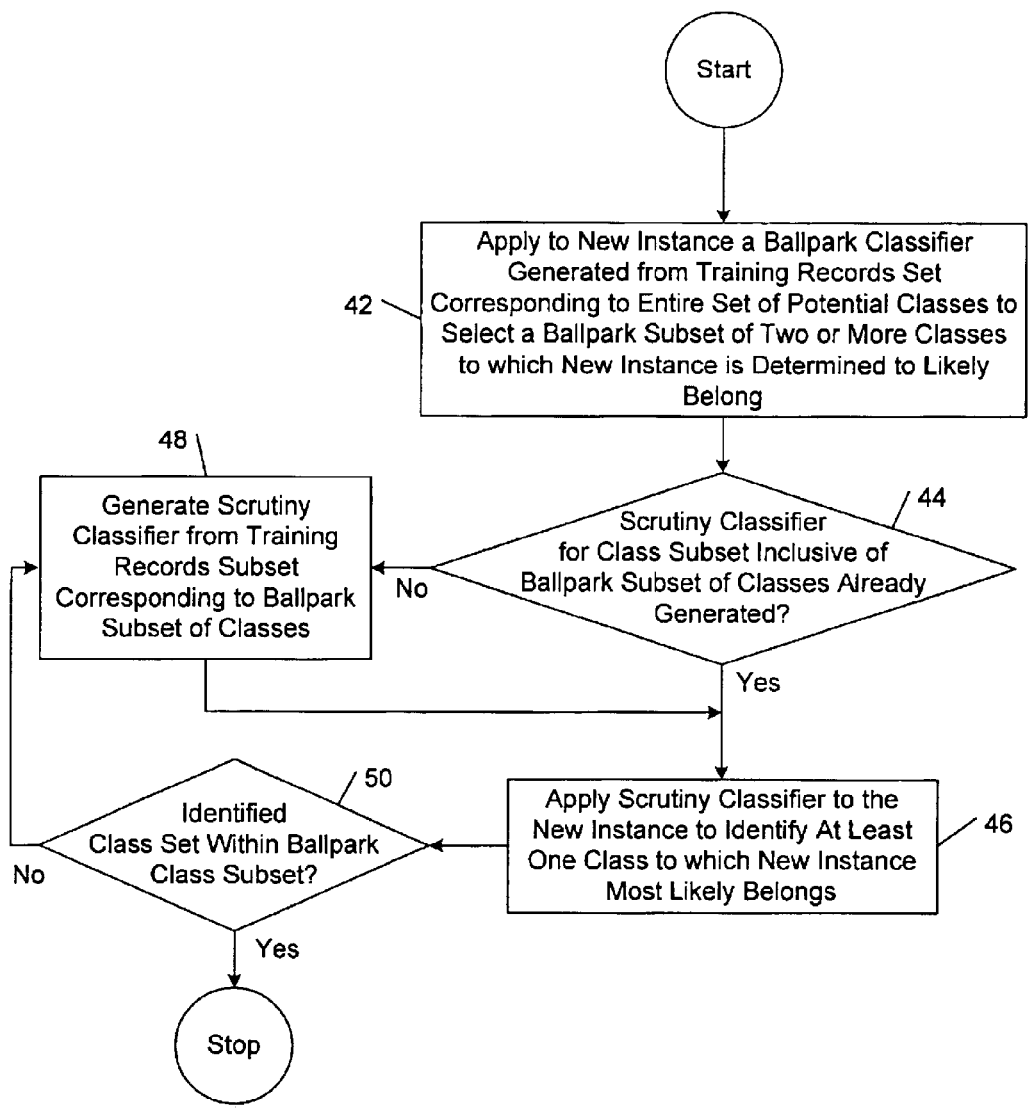
FIG. 3 is a flow diagram of an alternative classification method in which the scrutiny classifier may be generated beforehand in anticipation of the instance to be classified.

Referring to FIGS. 1 and 3, in one embodiment, new instance 12 may be classified using a pre-generated scrutiny classifier as follows. After being built, ballpark classifier 14 is applied to new instance 12 to select a subset 26 of two or more of the potential classes to which new instance 12 is determined to likely belong (step 42). If a pre-generated classifier exists for a class subset that is inclusive of the subset of classes that are selected by ballpark classifier 14 (step 44), that pre-generated classifier is applied to new instance 12 to identify a set 38 of at least one class to which new instance 12 most likely belongs (step 46). Otherwise a scrutiny classifier 20 is generated on-the-fly by second inducer 22 from a second set of training records corresponding to the subset of classes selected by ballpark classifier 14 (step 48). Once built, scrutiny classifier 20 is applied to new instance 12 to identify a set 38 of at least one class to which new instance 12 most likely belongs (step 46).

The amount of divergence between the inclusive subset of classes and the selected ballpark subset of classes may vary depending upon the classification task. For some classification tasks, a pre-generated classifier may be used only if the inclusive class subset is the same as the class subset selected by ballpark classifier 14. For other classification tasks, however, a pre-generated classifier may be used even if the pre-generated classifier had been trained on records corresponding to a class set containing one or more categories in addition to those selected by ballpark classifier 14. In these embodiments, if scrutiny classifier 20 identifies as among the most likely a class in class set 38 that is not contained in the ballpark class set 26 that was selected by ballpark classifier 14 (step 50), a scrutiny classifier is generated on-the-fly (step 48) and then applied to the new instance (step 46).

In some embodiments, a plurality of classifiers may be applied to a new instance to be classified until the set of proposed classes has been narrowed sufficiently. The proposed set of classes may be narrowed, for example, by selecting at each classification stage a preselected number of potential classes having highest assigned probability estimates or a preselected number of potential classes having highest assigned probability estimates and a cumulative assigned probability estimate exceeding a preselected threshold. These embodiments may be particularly useful for classification tasks in which the initial number of classes is very large.

Figure 4:
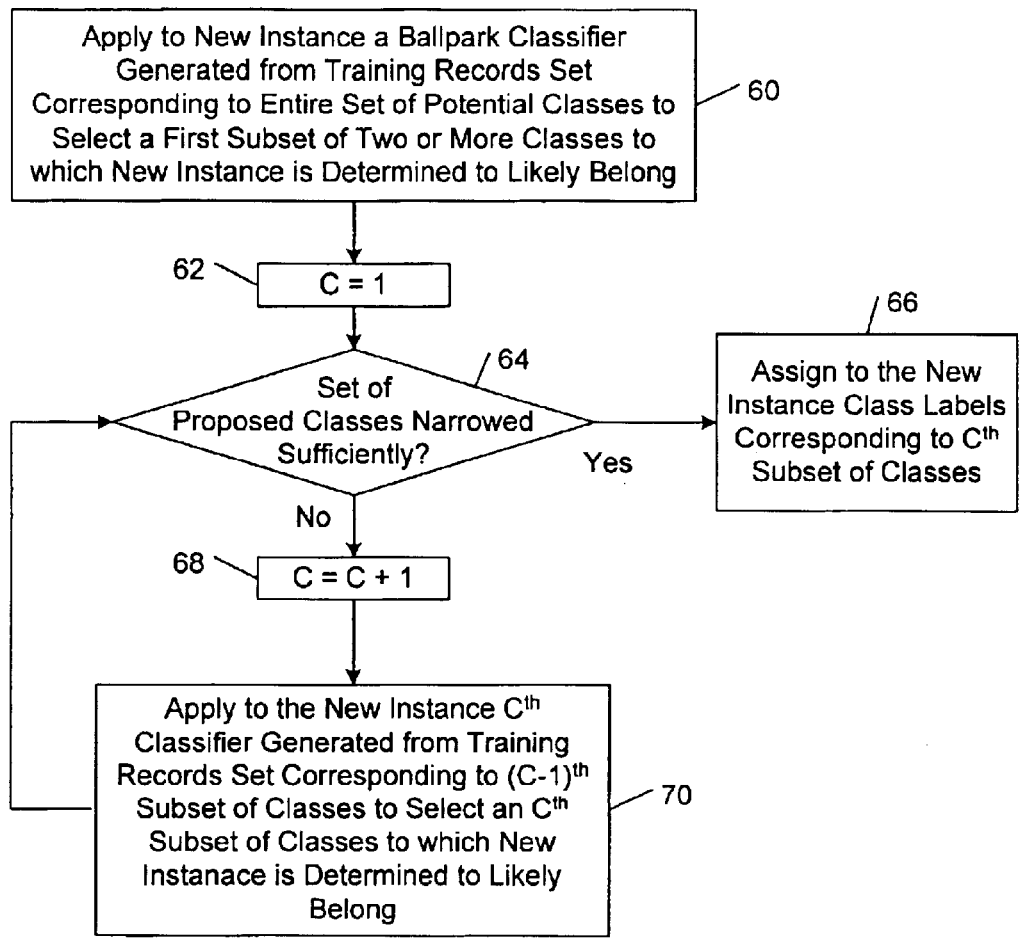
FIG. 4 is a flow diagram of another classification method in which successive classifiers are applied to a new instance to be classified until the set of proposed classes has been narrowed sufficiently.

Referring to FIGS. 1 and 4, in one embodiment, after being built, ballpark classifier 14 is applied to new instance 12 to select a first subset ($R_1$) of two or more of the potential classes to which new instance 12 is determined to likely belong (step 60). An iteration counter (C) initially is set to a value of 1 (step 62). If the set of proposed classes has been narrowed sufficiently (e.g., only one or a small number of classes remain) (step 64), one or more class labels corresponding to the selected first subset of classes are assigned to the new instance (step 66). Otherwise, the iteration counter is incremented by 1 (step 68), and a scrutiny classifier is generated from training records corresponding to first class subset $R_1$ and applied to the new instance to select a second subset of classes ($R_2$, where $R_2 \subset R_1$) to which the new instance is determined to likely belong (step 70). If the set of proposed classes has been narrowed sufficiently (step 64), one or more class labels corresponding to the selected subset of classes are assigned to the new instance (step 66). Otherwise, the process is repeated until the set of proposed classes has been narrowed sufficiently (steps 64, 68, 70).

The systems and methods described herein may be applied to a wide variety of classification tasks, including computer graphics, data mining, data visualization, developing customer class profiles, target marketing, medical diagnosis, treatment effectiveness, text classification, and store location searching. In addition, these systems and methods are not limited to any particular hardware or software configuration, but rather they may be implemented in any computing or processing environment. The classifier inducing algorithms preferably are implemented in a high level procedural or object oriented programming language; however, the algorithms may be implemented in assembly or machine language, if desired. In any case, the programming language may be a compiled or interpreted language.

Figure 5:
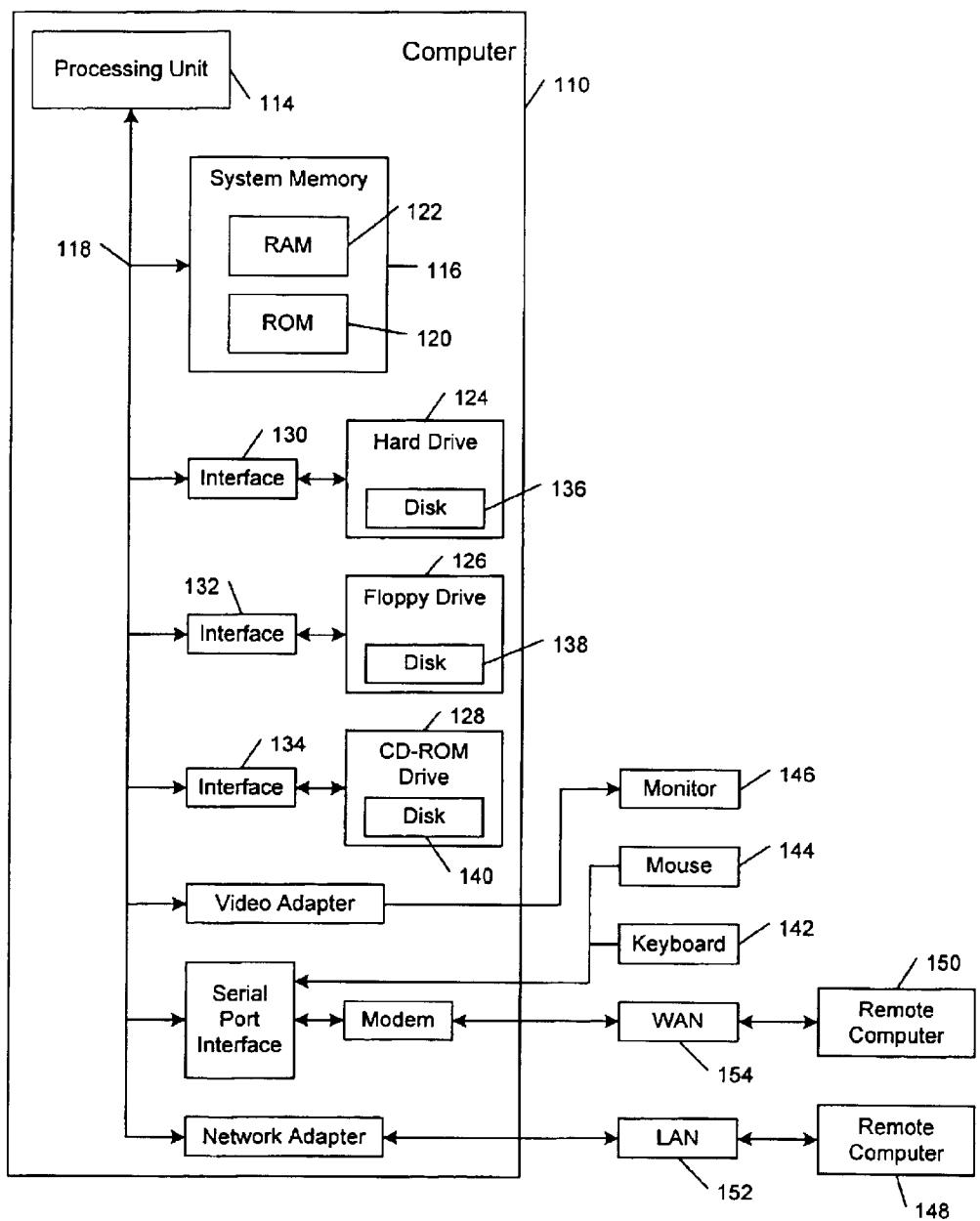
FIG. 5 is a block diagram of a computer on which the one or more classification methods described herein may be performed.

Referring to FIG. 5, in one embodiment, classification system 10 may be implemented as one or more respective software modules operating on a computer 110. Computer 110 includes a processing unit 114, a system memory 116, and a system bus 118 that couples processing unit 114 to the various components of computer 110. Processing unit 114 may include one or more processors, each of which may be in the form of any one of various commercially available processors. System memory 116 includes a read only memory (ROM) 120 that stores a basic input/output system (BIOS) containing start-up routines for computer 110, and a random access memory (RAM) 122. System bus 118 may be a memory bus, a peripheral bus or a local bus, and may be compatible with any of a variety of bus protocols, including PCI, VESA, Microchannel, ISA, and EISA. Computer 110 also includes a hard drive 124, a floppy drive 126, and CD ROM drive 128 that are connected to system bus 118 by respective interfaces 130, 132, 134. Hard drive 124, floppy drive 126, and CD ROM drive 128 contain respective computer-readable media disks 136, 138, 140 that provide non-volatile or persistent storage for data, data structures and computer-executable instructions. Other computer-readable storage devices (e.g., magnetic tape drives, flash memory devices, and digital video disks) also may be used with computer 110. A user may interact (e.g., enter commands or data) with computer 110 using a keyboard 142 and a mouse 144. Other input devices (e.g., a microphone, joystick, or touch pad) also may be provided. Information may be displayed to the user on a monitor 146. Computer 110 also may include peripheral output devices, such as speakers and a printer. One or more remote computers 148 may be connected to computer 110 over a local area network (LAN) 152, and one or more remote computers 150 may be connected to computer 110 over a wide area network (WAN) 154 (e.g., the Internet 38).

Other embodiments are within the scope of the claims.

What is claimed is:

1. A machine-implemented method of classifying an instance into one or more classes selected from a set of potential classes, comprising:

selecting from the set of potential classes a subset of two or more of the potential classes to which the instance is determined to most likely belong; and applying to the instance a scrutiny classifier generated from a set of training records, each including a respective class label matching a corresponding class in the selected subset of classes, to identify at least one class to which the instance most likely belongs.

2. The method of claim 1, wherein the subset of classes is selected based upon assignment to each of the potential classes a probability estimate of the instance belonging to the class.

3. The method of claim 2, wherein the selected subset of classes consists of a preselected number of potential classes having highest assigned probability estimates.

4. The method of claim 2, wherein the selected subset of classes consists of a number of potential classes having highest assigned probability estimates and a cumulative assigned probability estimate exceeding a preselected threshold.

5. The method of claim 2, wherein the probability estimates are assigned to each potential class by applying to the instance a ballpark classifier generated from a set of training records corresponding to the set of potential classes.

6. The method of claim 5, wherein the ballpark classifier is generated by a Naïve Bayes inducing algorithm.

7. The method of claim 1, wherein the subset of classes is selected based at least in part upon a prescribed misclassification cost.

8. The method of claim 1, wherein the scrutiny classifier is generated by a Naïve Bayes inducing algorithm.

9. The method of claim 1, wherein the scrutiny classifier is generated by a decision tree inducing algorithm.

10. The method of claim 1, further comprising generating the scrutiny classifier from the set of training records.

11. The method of claim 10, wherein the scrutiny classifier is generated from the set of training records corresponding to the selected subset of classes after the subset of classes has been selected.

12. The method of claim 10, wherein the scrutiny classifier is generated beforehand in anticipation of the instance to be classified.

13. The method of claim 12, wherein the scrutiny classifier is generated based upon an occurrence probability estimate for the inclusive class set.

14. The method of claim 13, further comprising selecting an inclusive class set encompassing the selected subset of classes from which to generate the scrutiny classifier.

15. The method of claim 1, further comprising applying to the instance a classifier generated from a set of training records corresponding to two or more classes identified by the scrutiny classifier to identify at least one class to which the instance is determined to most likely belong.

16. A data processing machine for classifying an instance into one or more classes selected from a set of potential classes, comprising:

a ballpark classifier configured to select from the set of potential classes a subset of two or more classes to which the instance is determined to most likely belong; and a scrutiny classifier generated from a set of training records, each including a respective class label matching a corresponding class in the subset of classes selected by the ballpark classifier for a given instance, the scrutiny classifier being configured to identify from the selected subset of classes at least one class to which the instance most likely belongs.

17. The machine of claim 16, wherein the ballpark classifier is generated from a set of training records corresponding to the set of potential classes.

18. The machine of claim 16, further comprising an inducer configured to generate a scrutiny classifier from a subset of the training records corresponding to a class set inclusive of a subset of classes selected by the ballpark classifier for a given instance.

19. The machine of claim 18, wherein the inducer is configured to generate the scrutiny classifier from the set of training records corresponding to the selected subset of classes after the subset of classes has been selected.

20. A computer program residing on a computer-readable medium for causing a processor executing the computer program to classifying an instance into one or more classes selected from a set of potential classes, the computer program comprising instructions to:

select from the set of potential classes a subset of two or more classes to which the instance is determined to most likely belong; and apply to the instance a scrutiny classifier generated from a set of training records, each including a respective class label matching a corresponding class in the selected subset of classes, to identify at least one class to which the instance most likely belongs.

* * * * *